Aug. 23, 1932. T. ROGATCHOFF 1,873,483
CROSSHEAD ADJUSTER
Filed July 3, 1930

Inventor,
Theodore Rogatchoff,
By Dalm + Taylor
Attorney

Patented Aug. 23, 1932

1,873,483

UNITED STATES PATENT OFFICE

THEODORE ROGATCHOFF, OF BALTIMORE, MARYLAND

CROSSHEAD ADJUSTER

Application filed July 3, 1930. Serial No. 465,771.

This said invention relates to an adjustment for crossheads.

An object of the invention is to provide means for adjusting the shoe relative to the body of the crosshead to compensate for the wear between the shoe and the crosshead guides.

A further object is to provide a simple and convenient means for taking up the wear between the shoe and guides and also in means for retaining the wear compensating means in adjusted position.

Another object is to provide a U-shaped wedge for insertion between the flanges of the crosshead and the shoe and in means for clamping the wedge against the shoe to hold the wedge in any adjusted position.

Figure 1:
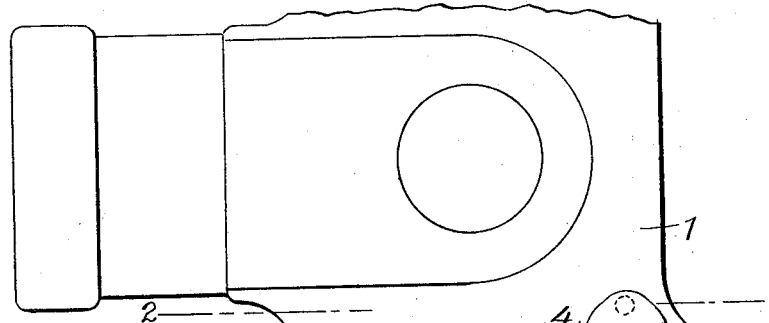
Figure 2:
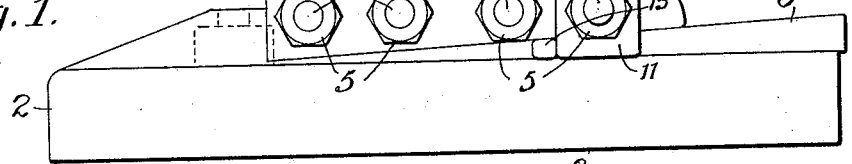
Figure 3:
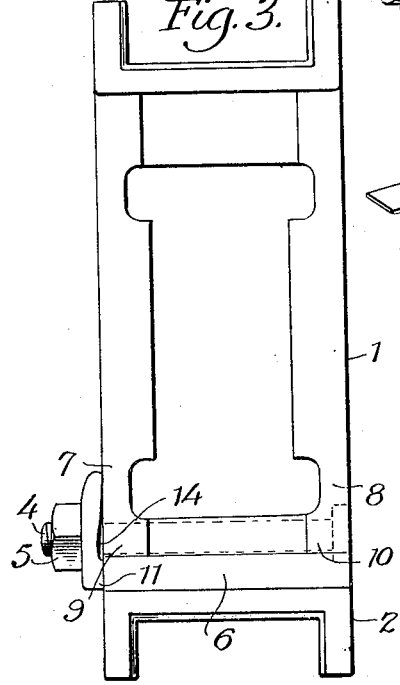
Figure 4:
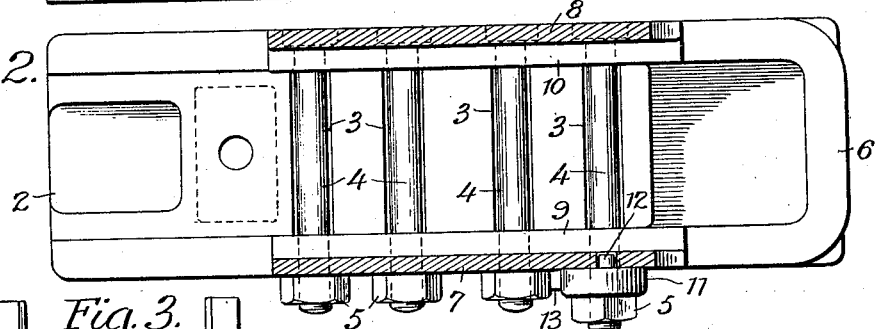
Figure 5:
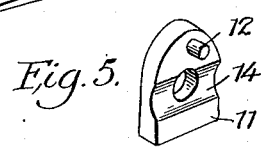

Referring to the drawing which is made a part of this application and in which similar reference characters indicate similar parts, Fig. 1 is a view of a conventional crosshead shown in side elevation with the adjusting mechanism in position, Fig. 2 shows a section on the line 2—2 of Fig. 1, Fig. 3 is a view in elevation of the construction shown in Fig. 1 as seen from the right, Fig. 4 is a perspective view of the adjusting wedge, and Fig. 5 is a detail view of the clamp for clamping the wedge against the shoe.

In the drawing the body of the crosshead is shown at 1 and the adjustable shoe at 2. In Fig. 2 the upper portion of the shoe is shown as provided with grooves 3 for the reception of the bolts 4 for clamping the side flanges 7 and 8 of the crosshead against the flanges 9 and 10 of the shoe. These flanges are clamped by means of nuts 5 on the bolts which may be released for the purpose of driving in the wedge to compensate for wear between the shoe and the crosshead guides.

As will be apparent from the drawing the shoe has on its upper surface two plane surfaces parallel to the base of the shoe upon which the lower surface of the wedge is adapted to rest. The flanges of the crosshead are inclined at the same angle as the upper surfaces of the wedge so that when the wedge is driven in to compensate for wear the crosshead will be lifted vertically. The outside walls of the flanges 9 and 10 are arranged at right angles to the plane surfaces of the shoe upon which the wedge rests. The tapered legs of the wedge are rectangular in cross section at all points and fit closely against the outer walls of the flanges 9 and 10. The clamp 11 is provided with an opening to receive the bolt shown at the right in Fig. 2 and is also provided with a lug or projection 12 for engagement with the corresponding hole in the crosshead flange 9 to prevent turning of the clamp upon the bolt. The clamp is also cut away on its inner face as indicated at 14 so that its lower inner face may clamp tightly against the side of the wedge without binding on its lower portion against the lower edge of the crosshead flange 7. The wedge 6 is also provided with a lug 13 to provide a safety stop for the wedge in the event it should become loose. In case the wedge becomes loose for any reason and tends to slip outwardly the lug 13 will engage the edge of the clamp 11 and be stopped thereby.

In making the adjustment the nuts 5 are loosened and the wedge driven in by hammer blows or by other means until the wear is taken up after which the nuts are again tightened. It will be observed that when the nut on the bolt shown at the right of Fig. 2 is tightened the upper end of the clamp 11 will engage the flange 7 and the lower portion of the inner face of the clamp will make contact with the outer side of the wedge and hold the wedge tightly between it and the flange 9 on the shoe. This clamping action will effectively retain the wedge in any adjusted position. This means of adjustment whereby a plane tapered wedge is held by means of a clamp engaging the plane side wall admits of a very fine degree of adjustment. Devices of a somewhat similar nature are old in the art but are not capable of the fine adjustment which can be obtained by this invention. Furthermore the clamping of the wedge against the outer wall of the flange 9 provides a very simple and effective means for retaining the wedge in any adjusted position. All of the contact surfaces between the wedge, the shoe and the crosshead are carefully machined to provide the best contact possible.

Having thus fully described my said invention, what I claim as new and desire to secure by Letters Patent is:—

1. A crosshead adjuster comprising in combination with a shoe and crosshead, of a U-shaped wedge having legs inclined to the same plane, the inner sides of said legs, engaging flanges on said shoe and a clamping member carried by said crosshead and engaging the smooth outer side of said wedge to clamp it against one of said flanges.

2. A crosshead adjuster comprising in combination with a crosshead and shoe, of a wedge designed to rest on said shoe and have its upper inclined surface in engagement with a complementary lower inclined surface on said crosshead, said shoe provided with an inner flange against which said crosshead is clamped, and a clamp carried by said crosshead and engaging the smooth side wall of said wedge to clamp the same against said flange.

3. A crosshead adjuster comprising in combination with a crosshead and shoe, of a wedge designed to rest on said shoe and have its upper inclined surface in engagement with a complementary lower inclined surface on said crosshead, said shoe provided with an inner flange against which said crosshead is clamped, a clamp carried by said crosshead and engaging the smooth side wall of said wedge to clamp the same against said flange, and a lug on the side wall of said wedge to engage said clamp to prevent escape of the wedge.

4. A crosshead adjuster comprising in combination, a shoe having a plane bearing surface and a flange perpendicular to said bearing surface, a crosshead having a depending wall clamped against the side of said flange, and a wedge rectangular in cross section and having plane vertical sides for adjusting said wall with respect to the upper surface of said shoe and a clamp carried by said cross head and having a plane clamping face for clamping said wedge against the side wall of said flange.

In testimony whereof I affix my signature.

THEODORE ROGATCHOFF.